US011168702B2

(12) United States Patent
Roberge (10) Patent No.: US 11,168,702 B2
(45) Date of Patent: Nov. 9, 2021

(54) ROTATING AIRFOIL WITH TIP POCKET (71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 638 days.

(21) Appl. No.: 15/673,635

(22) Filed: Aug. 10, 2017

(65) Prior Publication Data

US 2019/0048889 A1 Feb. 14, 2019

(51) Int. Cl.
F04D 29/38 (2006.01)
F04D 29/32 (2006.01)
(Continued)

(52) U.S. Cl.
CPC .......... F04D 29/384 (2013.01); F01D 5/147 (2013.01); F01D 5/20 (2013.01); F04D 29/324 (2013.01); F04D 29/325 (2013.01); F04D 29/382 (2013.01); F04D 29/526 (2013.01); F04D 29/668 (2013.01); F01D 21/045 (2013.01); F02K 3/06 (2013.01); F04D 25/045 (2013.01); F05D 2220/32 (2013.01);
(Continued)

(58) Field of Classification Search
CPC .... F04D 29/384; F04D 29/325; F04D 29/668; F04D 29/382; F04D 29/526; F04D 29/324; F04D 25/045; F01D 5/147; F01D 5/20; F01D 21/045; F02K 3/06; F05D 2220/32; F05D 2220/36; F05D 2240/307; F05D 2300/501
See application file for complete search history.

(56) References Cited

U.S. PATENT DOCUMENTS 1,828,409 A * 10/1931 Densmore ................ F01D 5/20
415/141
3,220,697 A * 11/1965 Smuland ................. F01D 5/187
416/96 R
(Continued)

FOREIGN PATENT DOCUMENTS

DE 10305351 8/2004
EP 2137382 5/2012
(Continued)

OTHER PUBLICATIONS

Opper, Hans Otto, "Compressor blade has in radially outer blade end one or more indentations in one or more rows", Aug. 19, 2004, DE 10305351, 1-13 (Year: 2004).*

(Continued)

Primary Examiner — Igor Kershteyn
Assistant Examiner — Joshua R Beebe
(74) Attorney, Agent, or Firm — Carlson, Gaskey & Olds, P.C.

(57) ABSTRACT

A fan blade for a gas turbine engine according to an example of the present disclosure includes, among other things, an airfoil section that has a pressure sidewall and a suction sidewall that meet together at both a leading edge and a trailing edge, and extends radially between a root portion and a tip portion. A tip pocket is defined by collapsible external walls of the tip portion, and has a pocket opening at a radially outer face of the tip portion.

24 Claims, 6 Drawing Sheets (51) Int. Cl.
*F04D 29/52* (2006.01)
*F04D 29/66* (2006.01)
*F01D 5/14* (2006.01)
*F01D 5/20* (2006.01)
*F02K 3/06* (2006.01)
*F04D 25/04* (2006.01)
*F01D 21/04* (2006.01)

(52) U.S. Cl.
CPC .... *F05D 2220/36* (2013.01); *F05D 2240/307* (2013.01); *F05D 2250/70* (2013.01); *F05D 2300/501* (2013.01)

(56) References Cited

U.S. PATENT DOCUMENTS

| | | | | |
|---|---|---|---|---|
| 5,259,724 | A * | 11/1993 | Liston | F01D 21/045 |
| | | | | 415/119 |
| 5,358,374 | A | 10/1994 | Correia et al. | |
| 6,206,642 | B1 * | 3/2001 | Matheny | F01D 5/147 |
| | | | | 415/173.3 |
| 7,114,912 | B2 | 10/2006 | Gerez et al. | |
| 7,320,575 | B2 | 1/2008 | Wadia et al. | |
| 8,366,400 | B2 * | 2/2013 | Ochiai | F01D 11/122 |
| | | | | 415/173.4 |
| 2003/0017050 | A1 | 1/2003 | Simeone et al. | |
| 2004/0009060 | A1 | 1/2004 | Romani et al. | |
| 2005/0106002 | A1 * | 5/2005 | Gerez | F01D 5/147 |
| | | | | 415/9 |
| 2009/0269189 | A1 * | 10/2009 | Bottome | F01D 11/12 |
| | | | | 415/173.3 |
| 2012/0051918 | A1 | 3/2012 | Glasspoole et al. | |
| 2012/0063909 | A1 * | 3/2012 | Bottome | F01D 5/14 |
| | | | | 416/228 |
| 2012/0177495 | A1 | 7/2012 | Virkler et al. | |
| 2012/0219405 | A1 | 8/2012 | Szwedowicz et al. | |
| 2013/0142651 | A1 * | 6/2013 | Lim | F01D 5/145 |
| | | | | 416/91 |
| 2017/0102004 | A1 * | 4/2017 | Krishnababu | F01D 5/20 |
| 2017/0226866 | A1 * | 8/2017 | Nishimura | F01D 5/20 |

FOREIGN PATENT DOCUMENTS

| | | | | |
|---|---|---|---|---|
| EP | 2913482 | | 9/2015 | |
| GB | 1107024 | A * | 3/1968 | F01D 5/20 |
| JP | 57119110 | | 7/1982 | |
| WO | 2014096839 | | 6/2014 | |

OTHER PUBLICATIONS

European Search Report for European Patent Application No. 18185527.1 completed Dec. 17, 2018.
The International Search Report and Written Opinion for PCT Application No. PCT/US2014/022507, dated Jul. 1, 2014.
International Preliminary Report on Patentability for PCT Application No. PCT/US2014/022507 dated Sep. 24, 2015.
European Search Report for European Patent Application No. 14769982 completed Sep. 21, 2016.

* cited by examiner

ROTATING AIRFOIL WITH TIP POCKET

STATEMENT REGARDING FEDERALLY SPONSORED RESEARCH OR DEVELOPMENT

This invention was made with government support under Contract No. FA8626-16-C-2139, awarded by the United States Air Force. The Government has certain rights in this invention.

BACKGROUND

This disclosure relates to a fan stage for gas turbine engines, and more particularly to rotating airfoils that include a tip pocket.

Gas turbine engine typically include a fan section, a compressor section, a combustor section and a turbine section. The fan section includes a plurality of fan blades spaced circumferentially to define a plurality of channels. The fan blades compress a portion of incoming air through the channels to produce thrust and also deliver a portion of air to the compressor section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The efficiency of a gas turbine engine can depend on many different factors. In addition to contributing to the overall efficiency of the engine, the fan section contributes to the weight of the engine. As such, features that reduce the collective weight of the fan blades or the weight of the fan section in general contribute positively to aircraft fuel consumption.

SUMMARY

A fan blade for a gas turbine engine according to an example of the present disclosure includes an airfoil section that has a pressure sidewall and a suction sidewall that meet together at both a leading edge and a trailing edge, and extends radially between a root portion and a tip portion. A tip pocket is defined by collapsible external walls of the tip portion, and has a pocket opening at a radially outer face of the tip portion.

In a further embodiment of any of the foregoing embodiments, the collapsible external walls include a suction side lip, a pressure side lip, a leading edge lip and a trailing edge lip that extend radially outwardly from a floor of the tip pocket.

In a further embodiment of any of the foregoing embodiments, the external walls are deformable in response to contact with a fan case.

In a further embodiment of any of the foregoing embodiments, the pressure side lip extends radially a first distance, and the suction side lip extends radially a second, different distance.

In a further embodiment of any of the foregoing embodiments, the second distance is greater than the first distance.

In a further embodiment of any of the foregoing embodiments, the external walls define one or more metering passages each having an inlet along an exterior surface of the airfoil section and an outlet in fluid communication with the tip pocket.

In a further embodiment of any of the foregoing embodiments, the one or more metering passages cause airflow to be delivered to the radially outer face of the tip portion in response to rotation of the fan blade.

In a further embodiment of any of the foregoing embodiments, the one or more metering passages are arranged to define a predetermined crease along at least one of the external walls in response to contact with a fan case.

In a further embodiment of any of the foregoing embodiments, the tip pocket is a plurality of recesses along the radially outer face of the tip portion.

In a further embodiment of any of the foregoing embodiments, at least some of the recesses of the plurality of recesses have an elliptical cross section.

A gas turbine engine according to an example of the present disclosure includes a fan section that has a fan rotor carrying an array of fan blades distributed about an engine axis, and a fan case at least partially surrounding the array of fan blades. A turbine drives the fan section. Each fan blade of the array of fan blades has an airfoil section that has a pressure sidewall and a suction sidewall that meet together at both a leading edge and a trailing edge, and extend radially between a root portion and a tip portion with respect to the engine axis, with a radially outer face of the tip portion defining a leakage gap with respect to the fan case. A tip pocket is defined by collapsible external walls of the tip portion. The tip pocket has a pocket opening at the radially outer face.

In a further embodiment of any of the foregoing embodiments, the array of fan blades define a forwardmost stage of the gas turbine engine.

In a further embodiment of any of the foregoing embodiments, the external walls are deformable in response to contact with the fan case.

In a further embodiment of any of the foregoing embodiments, the fan case is a fan containment case that is deformable in response to liberation of one or more fan blades of the array of fan blades from the fan rotor.

In a further embodiment of any of the foregoing embodiments, the external walls define one or more metering passages each having an inlet coupled to a fluid source and an outlet in fluid communication with the tip pocket. The one or more metering passages cause airflow to be delivered to the leakage gap in response to rotation of a respective one of the fan blades.

A method of operating a section of a gas turbine engine according to an example of the present disclosure includes moving an airfoil relative to a fan case. The airfoil includes pressure and suction sidewalls that meet together at both a leading edge and a trailing edge. A radially outer face defines a leakage gap with respect to the fan case, and a tip pocket that extends inwardly from the radially outer face causing external walls defining the tip pocket to collapse in response to contact between the airfoil and the fan case.

A further embodiment of any of the foregoing embodiments includes communicating flow from the tip pocket radially outward toward the fan case in response to rotation of the airfoil.

In a further embodiment of any of the foregoing embodiments, the step of communicating flow includes directing flow through the tip pocket to heat portions of the external walls.

In a further embodiment of any of the foregoing embodiments, the step of communicating flow includes directing flow from an exterior surface of the airfoil, through the tip pocket, and then through a pocket opening along the radially outer face.

The method as recited in claim 18, comprising dimensioning the tip pocket such that the airfoil is tuned with respect to one or more vibratory modes.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1A:
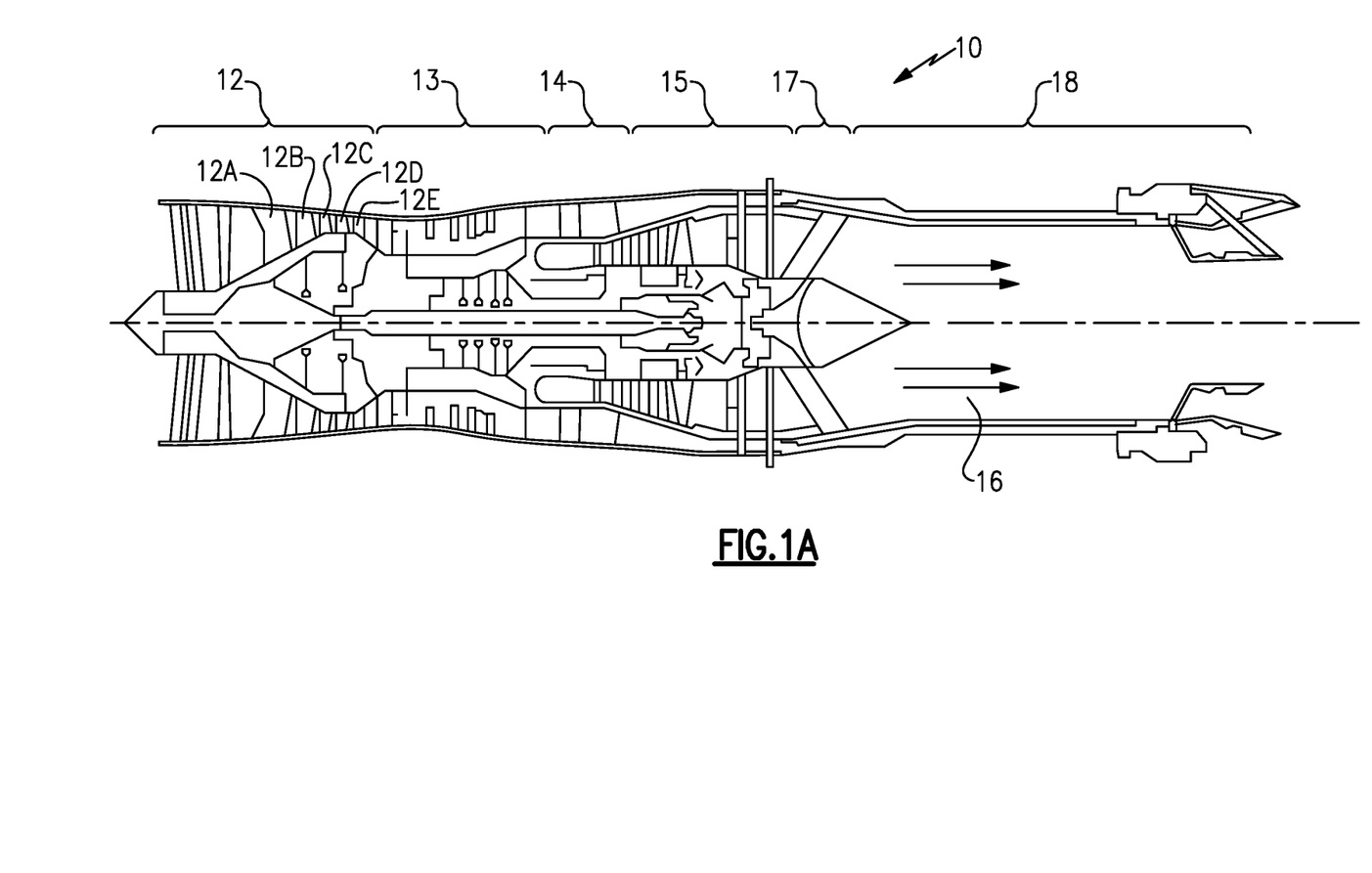
FIG. 1A shows a gas turbine engine according to a first example.

Referring to FIG. 1A, a gas turbine engine 10 includes a fan section 12, a compressor section 13, a combustor section 14, and a turbine section 15. Air entering into the fan section 12 is initially compressed and fed to the compressor section 13. The fan section 12 can include a plurality of fan stages 12A-12E of rotatable fan blades, for example, and in other examples may have only one fan stage. In the compressor section 13, the incoming air from the fan section 12 is further compressed and communicated to the combustor section 14. In the combustor section 14, the compressed air is mixed with gas and ignited to generate a hot exhaust stream 16. The hot exhaust stream 16 is expanded through the turbine section 15 to drive the fan section 12 and the compressor section 13. In this example, the gas turbine engine 10 includes an augmenter section 17 where additional fuel can be mixed with exhaust gasses in the hot exhaust stream 16 and ignited to generate additional thrust. The exhaust gasses flow from the turbine section 15 and the augmenter section 17 through an exhaust duct and nozzle assembly 18.

Figure 1B:
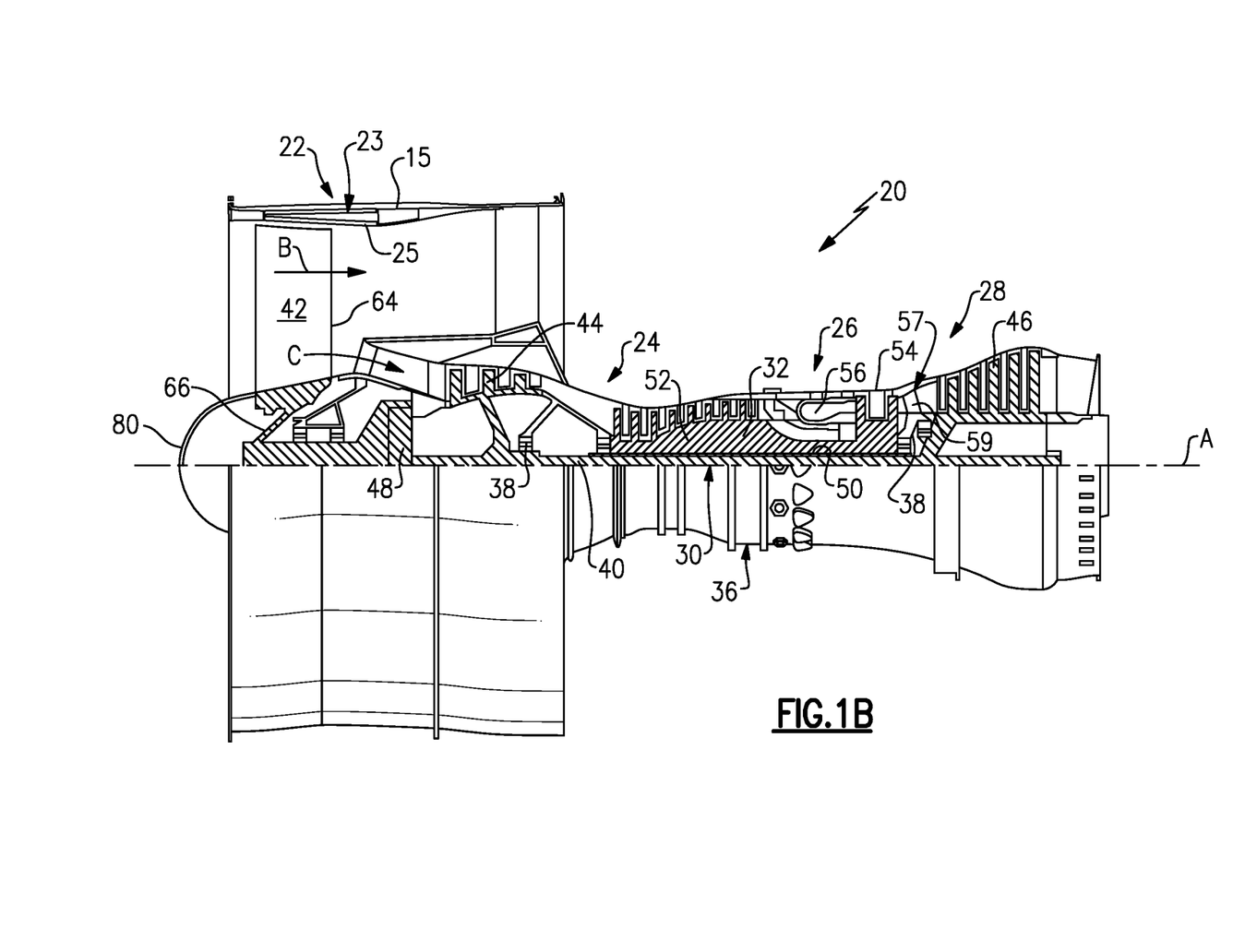
FIG. 1B shows a gas turbine engine according to a second example.

FIG. 1B schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including direct-drive and geared fan three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7° R)]^{0.5}$. The "Low corrected fan tip speed" as disclosed herein according to one non-limiting embodiment is less than about 1150 ft/second.

FIGS. 2 and 3A-3C illustrate aspects of the fan section 22. Although the teachings herein primarily refer to a forward-most stage of the engine 20 defined by fan section 22 of FIG. 2, the teachings herein can also be applied to one or more of the fan stages 12A-12E of engine 10, such as the first or second fan stages 12A, 12B. The teachings herein may benefit other portions of engine 10 and/or engine 20, such as rotatable airfoils in compressor section 13 or compressor section 24. Other systems may also benefit from the teachings herein, such as land-based industrial turbine applications.

Figure 2:
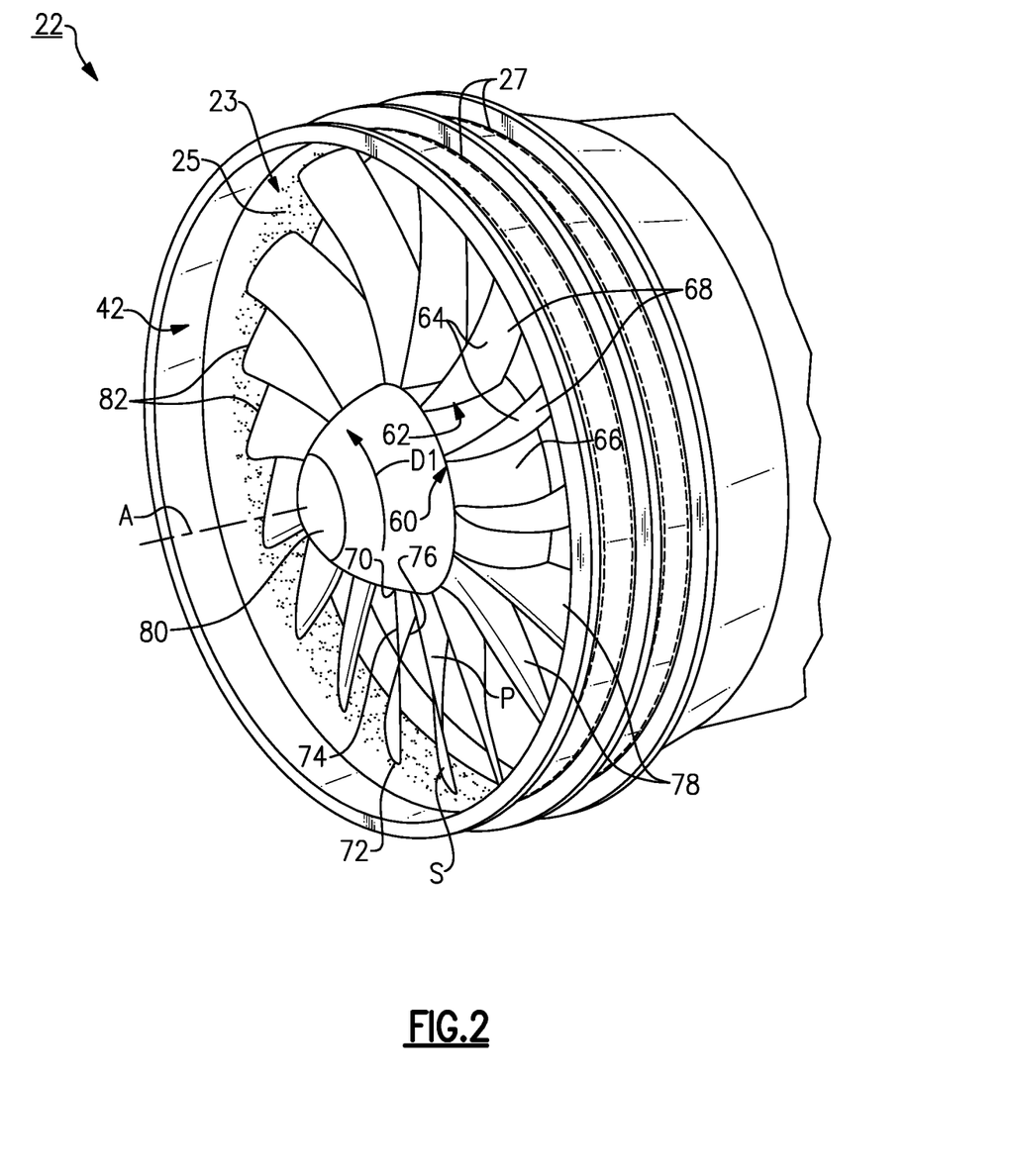
FIG. 2 is a perspective view of a fan section.

The fan 42 includes a rotor 60 having an array or row 62 of rotatable airfoils or fan blades 64 that extend circumferentially around and are supported by a fan hub 66. Any suitable number of fan blades 64 may be used in a given application, such as 26 or fewer fan blades, or more narrowly between 12 and 20 fan blades.

The fan hub 66 is rotatable in a direction D1 about the engine axis A. The direction D1 can be clockwise or counterclockwise with respect to the engine axis A. The array 62 of fan blades 64 are positioned about the axis A in a circumferential or tangential direction Y, which is generally perpendicular to a direction X that may be coaxial with, or substantially parallel to, the engine axis A. Each of the fan blades 64 includes an airfoil section 68 that extends in a radial or spanwise direction R from the hub 66 between a root portion 70 and a tip portion 72, in a chordwise direction H (axially and circumferentially) between a leading edge 74 and a trailing edge 76, and in a thickness direction T between a pressure sidewall P and a suction sidewall S. The pressure sidewall P and the suction sidewall S are spaced apart and generally meet together at both the leading and trailing edges 74, 76.

In one example, the fan section 22 includes a hardwall containment case or system 23 arranged about the engine axis A and spaced radially from the fan 42. The fan containment case 23 is deformable in response to liberation or separation of one or more of the fan blades 64 from the fan rotor 60. The fan containment case 23 is configured to contain, and absorb the impact of, a fan blade 64 or a fragment thereof.

Various materials and structures of the fan case 15 and/or fan containment case 23 can be utilized. In examples, the fan containment case 23 is a hard ballistic liner applied to the nacelle or fan case 15. The hard ballistic liner can include a rigid material such as a resin impregnated fiber structure, metallic structures, or ceramic structures. For example, the fan section 22 may include a composite fan case 15 made of an organic matrix composite. The organic matrix composite can include a matrix material and reinforcement fibers distributed through the matrix material. The reinforcement fibers may be discontinuous or continuous, depending upon the desired properties of the organic matrix composite, for example. The matrix material may be a thermoset polymer or a thermoplastic polymer. The reinforcement fibers can include carbon graphite, silica glass, silicon carbide, or ceramic, for example. The fan containment case 23 can also include an abradable case treatment 25. Abradable case treatments can include a composite material being less rigid that the fan case 15 or a honeycomb structure, for example. In other examples, the fan containment case 23 is a titanium case or a metallic case having one or more outer Kevlar containment reinforcing bands 27 (shown in dashed lines in FIG. 2). The disclosed arrangements of the fan case 15 can reduce the overall weight of the engine and improve aircraft fuel consumption.

Each fan blade 64 has an exterior surface 78 providing a contour that extends in the chordwise direction H from the leading edge 74 to the trailing edge 76. The exterior surface 78 generates lift based upon its geometry and directs flow along the core flow path C and bypass flow path B (FIG. 1B). The fan blade 64 may be constructed from a composite material, an aluminum or titanium alloy, or a combination of one or more of these, for example. Abrasion-resistant coatings or other protective coatings may be applied to the fan blade 64.

The root portion 70 is received in a correspondingly shaped slot in the hub 66. The airfoil section 68 extends radially outward of a platform 73 (FIG. 3A), which provides the inner flow path. The platform 73 may be integral with the blade 64 or separately secured to the hub 66, for example. In some examples, the fan blade 64 is joined or machined integral with the hub 66 to form an integrally bladed rotor (IBR). A spinner 80 is supported relative to the hub 66 to provide an aerodynamic inner flow path into the fan section 22.

Figure 3A:
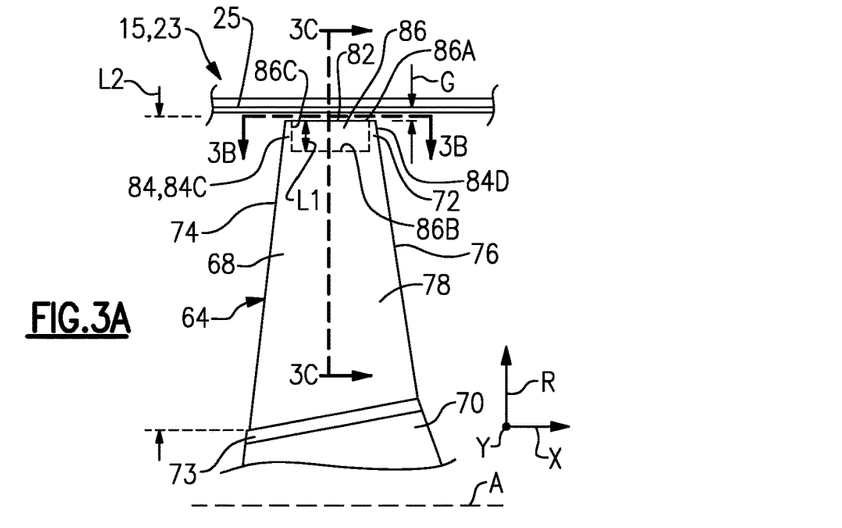
FIG. 3A is a side view of the fan section of FIG. 2.
Figure 3B:
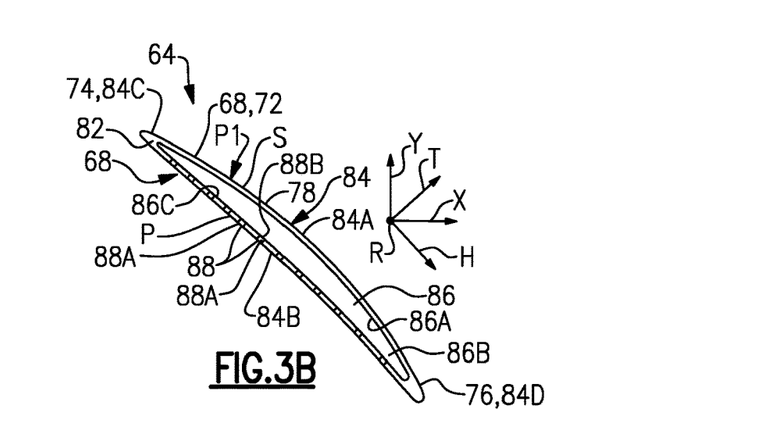
FIG. 3B is a view of a fan blade of the fan section of FIG. 3A taken along line 3B-3B.

A radially outer face 82 defined by the tip portion 72 of each fan blade 64 is situated adjacent to the fan case 15 to define a leakage gap G (FIG. 3A). The leakage gap G can be relatively small to reduce aerodynamic impacts of leakage from the higher pressure surface of the airfoil to lower pressure suction surface and thermal efficiency losses.

The tip portion 72 includes collapsible external walls 84 that define the radially outer face 82 and the exterior surface 78 of the airfoil section 68. The external walls 84 define a tip pocket 86 having a pocket opening 86A at the radially outer face 82. The tip pocket 86 is recessed in, or otherwise extends inwardly from, the radially outer face 82. The external walls 84 include a suction side lip 84A, a pressure side lip 84B, a leading edge lip 84C and a trailing edge lip 84D that extend radially outwardly from a floor 86B of the tip pocket 86. The pocket opening 86A is open, or otherwise substantially free of any obstructions, during operation of the engine 20 to provide access to the tip pocket 86. The tip pocket 86 can be cast or machined in the fan blade 64, for example, although other techniques can be utilized.

The tip pocket 86 can be dimensioned to reduce a weight of the respective fan blade 64, and thereby reduce a weight of the fan section 22 and an overall weight of the engine 20. A reduction in weight of the fan blade 64 can also reduce the centrifugal pull on the rotor 60. The reduction in mass of the fan blade 64 can also reduce the weight of the fan case 15 by reducing the amount of material to absorb the impact of the fan blade 64 during a blade out condition. The reduction in mass of the fan blade 64 by dimensioning the tip pocket 86 and/or external walls 84 in a controlled or preferential manner can also enable adjustment or tuning of one or more resulting vibratory modes of the fan blade 64, including vibratory modes that may be observed during various operating conditions of the engine 10/20 including takeoff, cruise or approach.

A depth of the tip pocket 86 can be dimensioned to further reduce a mass of the fan blade 64. For example, a depth or length L1 of the tip pocket 86 can be between about 5% and about 90% of a corresponding span length L2 of the airfoil section 68 in the radial direction R between the platform 73 and the radially outer face 82 (FIG. 3A). In some examples, length L1 is equal to or less than 20% of length L2.

Figure 4:
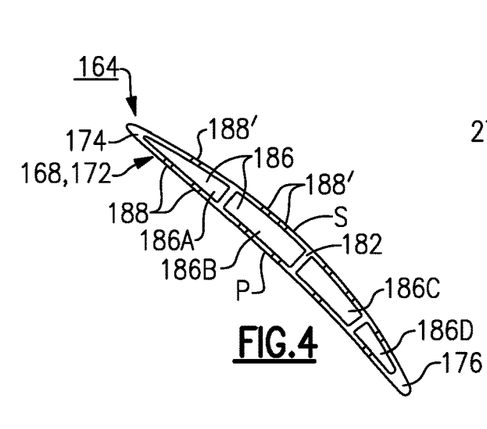
FIG. 4 is a cross-sectional view of a fan blade according to a second example.
Figure 5:
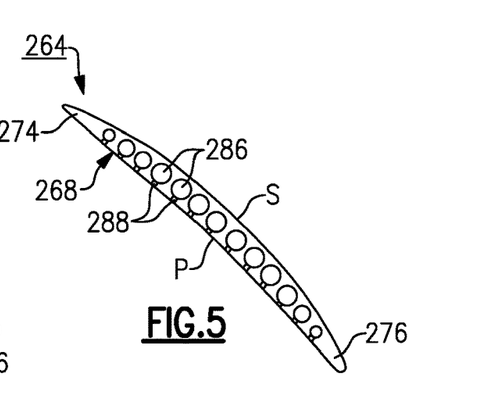
FIG. 5 is a cross-sectional view of a fan blade according to a third example.

The tip pocket 86 and the pocket opening 86A can have various geometries or profiles. In the illustrated example of FIGS. 3A-3C, the tip pocket 86 is a single tip pocket having a single pocket opening 86A. Walls 86C of the tip pocket 86 and/or the pocket opening 86A can have substantially the same contour as a perimeter P1 (FIG. 3B) of the exterior surface 78 of the tip portion 72 at the corresponding span position. With this arrangement, the suction and pressure side lips 84A, 84B can each have a substantially continuous width between the leading and trailing edges 74, 76. In alternate embodiments, a thickness of one of the lips 84A/84B may be thicker than another one of the one of the lips 84A/84B to provide preferential strengthening to resist impact from birds or other objects, for example. In the illustrated example of FIG. 4, each fan blade 164 can have a plurality of tip pockets 186 in the form of a plurality of recesses along a radially outer face 182 of a tip portion 172, and at least some of the tip pockets 186A-186D and/or the respective pocket openings can have different geometries or cross-sectional profiles. In the illustrated example of FIG. 5, each fan blade 264 can define a plurality of tip pockets 286 with at least some or each of the tip pockets 286 having a generally cylindrical shape that defines an elliptical cross-sectional profile. The tip pocket(s) 86/186/286 can also be dimensioned with respect to vibratory modes of the fan blade 64/164/264 and/or expected operational conditions.

The external walls 84 can define one or more metering passages 88 (FIGS. 3B-3C) defined in a thickness of the airfoil section 68, such as along a relatively high pressure side of the tip portion 72. Each metering passage 88 includes an inlet 88A and an outlet 88B. The inlet 88A is defined along a location of the exterior surface 78 of the airfoil section 68, and the outlet 88B is in fluid communication with the tip pocket 86. Various geometries of the metering passage 88, including inlet 88A and outlet 88B, can be utilized, such as a generally elliptical cross-sectional geometry. In other examples, the metering passage 88 can have a generally rectangular or slot-shaped cross-sectional geometry.

The metering passage 88 can supply fluid or airflow F (FIG. 3C) to the tip pocket 86 and can cause the airflow F to be delivered or otherwise communicated radially outward to the radially outer face 82 of the tip portion 72 and toward the fan case 15 in response to rotation of the fan blade 64. In the illustrated example of FIG. 3C, airflow F is directed from the exterior surface 78 of the fan blade 64, through the tip pocket 86, and then through the pocket opening 86A along the radially outer face 82. Airflow F delivered to the leakage gap G by the metering passage(s) 88 can cause an air dam to be generated to oppose flow around the tip portion 72 and through the leakage gap G, thereby reducing tip leakage efficiency losses.

The metering passages 88 can be distributed in the chordwise direction H (FIG. 3C) along a relatively high pressure side of the fan blade 64 (e.g., the pressure side lip 84B). The metering passages 88 can also be distributed in the radially direction R, for example (88, 88' of FIG. 3C). Pressurization of airflow F relative to the pressure existing from outlet 88B can be influenced by establishing a radial distance of the flow inlet 88A to flow discharge at the radially outer face 82. In some examples, the metering passages 88 are defined less than half of the distance between the floor 86B and the radially outer face 82 (i.e., relatively closer to the floor 86B) to increase a pumping effect caused by delivery of airflow by the metering passages 88 into the tip pocket 86.

The metering passages 88 can be distributed along a leading one of the pressure and/or suction sidewalls P, S with respect to the direction D1 (FIGS. 2 and 3C) of rotation about the engine axis A. In the illustrated example of FIG. 3B, each fan blade 64 includes a plurality of metering passages 88 distributed along the pressure sidewall P. In some examples, each tip pocket has one or more metering passages (see, e.g., tip pockets 186 of FIG. 4). Alternatively, or additionally, one or more metering passages can be distributed along the suction sidewall S (indicated by 188' of FIG. 4).

Figure 3C:
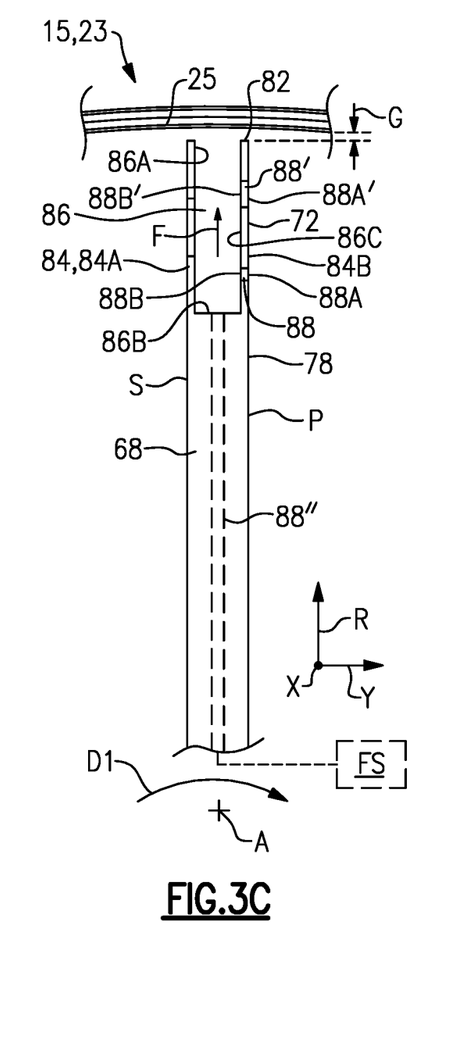
FIG. 3C is a cross-sectional view of the fan section of FIG. 3A taken along line 3C-3C.

In some examples, the fan blade 64 can define one or more metering passages 88" extending radially through the airfoil section 68 (one shown in FIG. 3C for illustrative purposes). Each metering passage 88" can be fluidly coupled to a fluid source FS (FIG. 3C) that supplies an amount of airflow. Example fluid sources FS can include pressurized bleed air from a stage of the compressor section 24 or bypass airflow from the bypass flow path B (FIG. 1B) and discharge flow from heat exchangers used to cool components in engines 10 or 20. In addition to providing a passage for exit of airflow F, a resulting heating of fan blade 64 may be used to facilitate anti-ice or de-ice of the fan blade 64, including surfaces of the tip pocket 86 and surrounding portions of the external walls 84, during operating conditions favoring ice deposition on airfoil surfaces thereby reducing a likelihood of deterioration in aerodynamic performance.

Figure 6A:
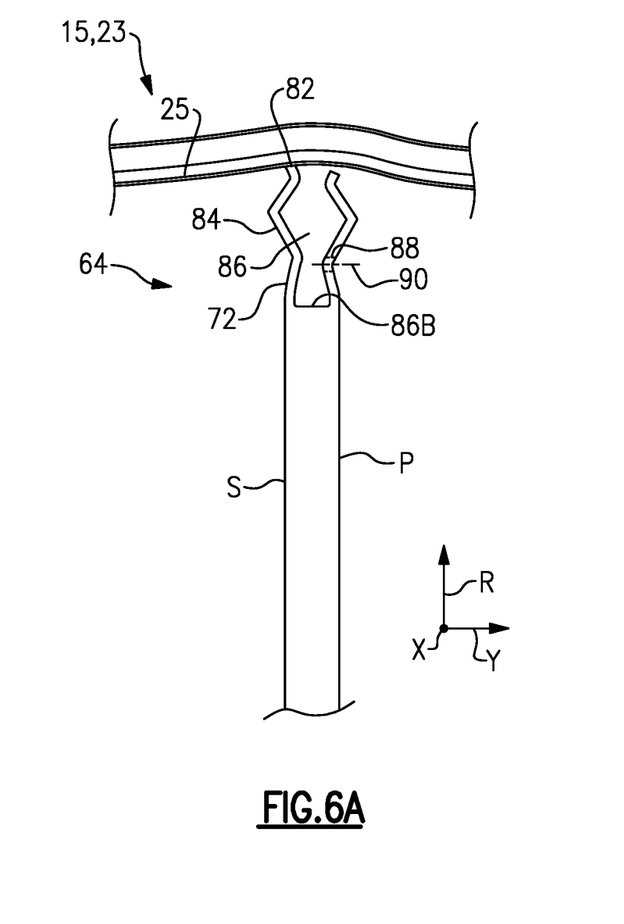
FIG. 6A illustrates a fan blade at a first position.
Figures 6B, 6C:
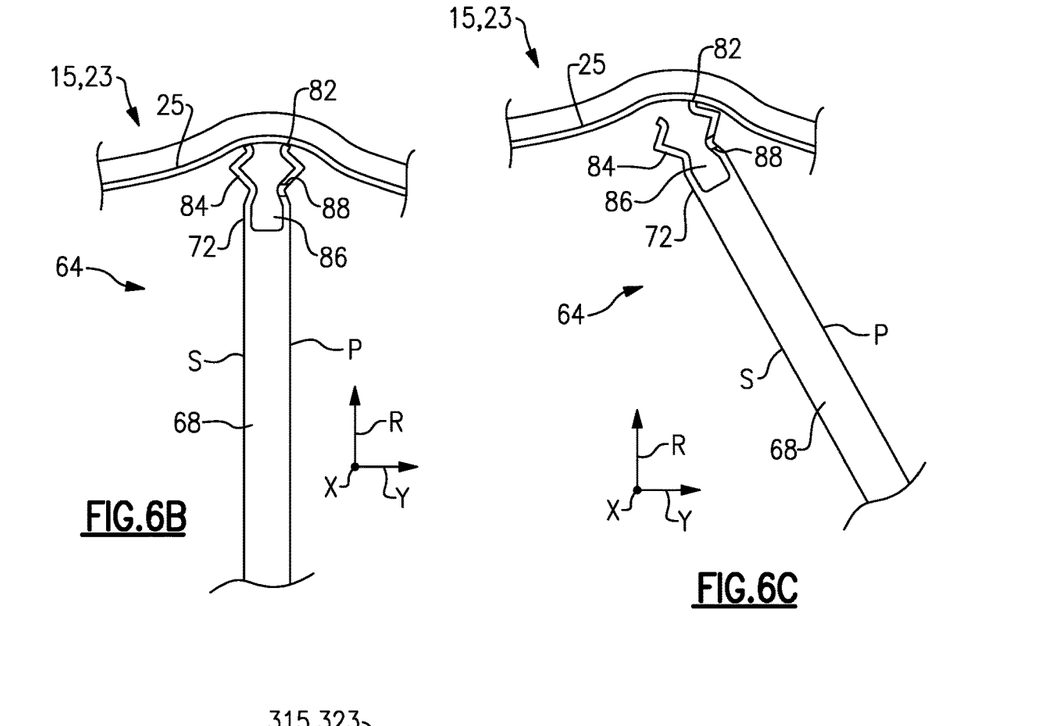
FIG. 6B illustrates a fan blade at a second position.
FIG. 6C illustrates a fan blade at a third position.

Referring to FIGS. 6A to 6C, one or more portions of the external walls 84 can be deformable in response to contact with the fan case 15 or fan containment case 23, such as during a blade out condition due to liberation of all or a significant portion of a fan blade 64 from the rotor 60 (FIG. 2) during engine operation. FIG. 3C illustrates the fan blade 64 at a first position during normal operation.

The collapsible external walls 84 define a "crumple zone" for absorbing energy by way of plastic deformation. FIG. 6A illustrates a displaced fan blade 64 at a first position subsequent to separation from the rotor 60 (e.g., at time =a). In the first position, the displaced fan blade 64 moves radially outward such that the radially outer face 82 of the fan blade 64 engages or otherwise contacts the fan case 15. This causes the external walls 84 to begin to collapse or otherwise deform in response to contact between the fan blade 64 and the fan case 15 or fan containment case 23. Portions of the external walls 84 can collapse outwardly and/or inwardly toward the tip pocket 86. Contact with the fan blade 64 may cause portions of the fan case 15 or fan containment case 23 to deform or deflect under impact.

As illustrated by FIG. 6A, one or more metering passages 88 (one shown for illustrative purposes) can be arranged to define a predetermined crease along a reference plane 90 that extends along at least one of the external walls 84 in response to contact with a fan case 15. The predetermined crease can be defined to cause the airfoil 64 to pivot in a desired direction or angle of rotation upon impact.

FIG. 6B illustrates the fan blade 64 at a second position subsequent to separation from the rotor 60 (e.g., at time=b). The external walls 84 and the fan case 15 or fan containment case 23 continue to collapse or deform. FIG. 6C illustrates the fan blade 64 at a third position subsequent to separation from the rotor 60 (e.g., at time=c). In the third position, the external walls 84 may continue to collapse or otherwise deform. The fan blade 64 pivots in the circumferential direction Y and can travel axially aft in the axial direction X, for example.

Figure 7:
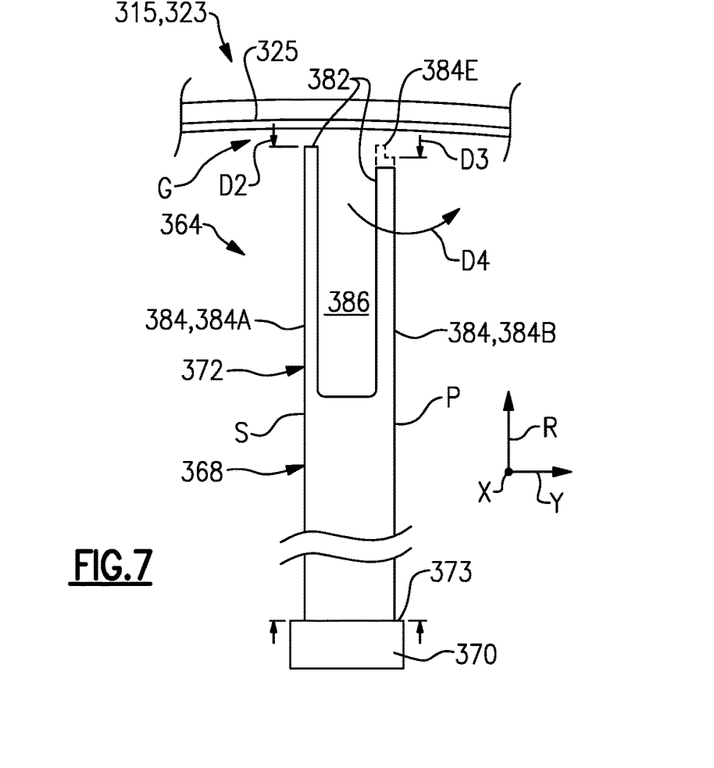
FIG. 7 is a cross-sectional view of a fan section according to another example.

Referring to FIG. 7, an airfoil or fan blade 364 according to another example is shown. External walls 384 along a tip portion 372 of the fan blade 364 can be dimensioned to cause the fan blade 364 to rotate toward a desired direction D4 in response to contact with the fan case 315 or fan containment case 323 due to liberation of the fan blade 364.

The suction side lip 384A can extend a first distance D2, and the pressure side lip 384B can extend a second, different distance D3 each with respect to platform 373. In the illustrated example of FIG. 7, the second distance D3 is greater than the first distance D2 such that the fan blade 364 pivots about pressure side lip 384B in response to contact with the fan case 315. For example, contact with the fan case 315 may cause root portion 370 of the fan blade 364 to pivot in a direction of rotation of the fan blade 364 at a relatively faster rate of speed than the tip portion 372. In alternative examples, the second distance D3 is less than the first distance D2 such that the fan blade 364 pivots about suction side lip 384A. In other examples, at least one of the external walls 384 defines a step 384E (shown in dashed lines) such that a distance between the radially outer face 382 and the fan case 315 differs in the circumferential direction Y. These arrangements can reduce a likelihood that the fan blade 364 will cause damage or otherwise contact neighboring fan blades during a blade out condition.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A fan blade for a gas turbine engine comprising:
   an airfoil section including a pressure sidewall and a suction sidewall that meet together at both a leading edge and a trailing edge, and extending radially between a root portion and a tip portion; and
   a tip pocket defined by collapsible external walls of the tip portion, and having a pocket opening at a radially outer face of the tip portion.

2. The fan blade as recited in claim 1, wherein the collapsible external walls include a suction side lip, a pressure side lip, a leading edge lip and a trailing edge lip that extend radially outwardly from a floor of the tip pocket.

3. The fan blade as recited in claim 2, wherein the external walls are deformable in response to contact with a fan case.

4. The fan blade as recited in claim 2, wherein the pressure side lip extends radially a first distance, and the suction side lip extends radially a second, different distance.

5. The fan blade as recited in claim 4, wherein the second distance is greater than the first distance.

6. The fan blade as recited in claim 5, wherein:
   the external walls define a crumple zone that is plastically deformable in response to contact with a fan case;
   the tip pocket is a plurality of recesses along the radially outer face of the tip portion;
   the external walls along the pressure side lip define one or more metering passages each interconnecting an exterior surface of the airfoil section and a respective one of the plurality of recesses;
   the one or more metering passages are arranged to define a predetermined crease along the pressure side lip such that the respective fan blade pivots in a predetermined direction in response to contact with the fan case; and
   the suction side lip is free of any metering passages.

7. The fan blade as recited in claim 6, wherein pressure side lip defines a step having an L-shaped geometry defining the first distance.

8. The fan blade as recited in claim 1, wherein the external walls define one or more metering passages each having an inlet along an exterior surface of the airfoil section and an outlet in fluid communication with the tip pocket.

9. The fan blade as recited in claim 8, wherein the one or more metering passages cause airflow to be delivered to the radially outer face of the tip portion in response to rotation of the fan blade.

10. The fan blade as recited in claim 8, wherein the one or more metering passages are arranged to define a predetermined crease along at least one of the external walls in response to contact with a fan case.

11. The fan blade as recited in claim 1, wherein the tip pocket is a plurality of recesses along the radially outer face of the tip portion.

12. The fan blade as recited in claim 11, wherein at least some of the recesses of the plurality of recesses have an elliptical cross section.

13. A gas turbine engine, comprising:
   a fan section including a fan rotor carrying an array of fan blades distributed about an engine axis, and a fan case at least partially surrounding the array of fan blades;
   a turbine driving the fan section; and
   wherein each fan blade of the array of fan blades comprises:
      an airfoil section including a pressure sidewall and a suction sidewall that meet together at both a leading edge and a trailing edge, and extending radially between a root portion and a tip portion with respect to the engine axis, with a radially outer face of the tip portion defining a leakage gap with respect to the fan case; and a tip pocket defined by collapsible external walls of the tip portion, the tip pocket having a pocket opening at the radially outer face.

14. The gas turbine engine as recited in claim 13, wherein the array of fan blades define a forwardmost stage of the gas turbine engine.

15. The gas turbine engine as recited in claim 13, wherein the external walls are deformable in response to contact with the fan case.

16. The gas turbine engine as recited in claim 15, wherein the fan case is a fan containment case that is deformable in response to liberation of one or more fan blades of the array of fan blades from the fan rotor.

17. The gas turbine engine as recited in claim 16, wherein:
the array of fan blades define a forwardmost stage of the gas turbine engine;
the collapsible external walls include a suction side lip, a pressure side lip, a leading edge lip and a trailing edge lip that extend radially outwardly from a floor of the tip pocket;
the external walls define a crumple zone that is plastically deformable in response to contact with the fan case;
the external walls along the pressure side lip define one or more metering passages each interconnecting an exterior surface of the airfoil section and the tip pocket;
the one or more metering passages are arranged to define a predetermined crease along the pressure side lip such that the respective fan blade pivots in a predetermined direction in response to contact with the fan case; and
the suction side lip is free of any metering passages.

18. The gas turbine engine as recited in claim 13, wherein the external walls define one or more metering passages each having an inlet coupled to a fluid source and an outlet in fluid communication with the tip pocket, and wherein the one or more metering passages cause airflow to be delivered to the leakage gap in response to rotation of a respective one of the fan blades.

19. A method of operating a section of a gas turbine engine, comprising:
moving an airfoil relative to a fan case, wherein the airfoil includes pressure and suction sidewalls that meet together at both a leading edge and a trailing edge, a radially outer face defining a leakage gap with respect to the fan case, and a tip pocket extending inwardly from the radially outer face; and
causing external walls defining the tip pocket to collapse in response to contact between the airfoil and the fan case.

20. The method as recited in claim 19, comprising communicating flow from the tip pocket radially outward toward the fan case in response to rotation of the airfoil.

21. The method as recited in claim 20, wherein:
the external walls define a crumple zone that is plastically deformable in response to the contact between the airfoil and the fan case;
the external walls include a suction side lip, a pressure side lip, a leading edge lip and a trailing edge lip that extend radially outwardly from a floor of the tip pocket;
the external walls along the pressure side lip define a plurality of metering passages each interconnecting an exterior surface of the airfoil section and the tip pocket;
the plurality of metering passages are arranged to define a predetermined crease along the pressure side lip such that the airfoil pivots in a predetermined direction in response to the contact between the airfoil and the fan case; and
the suction side lip is free of any metering passages.

22. The method as recited in claim 20, wherein the step of communicating flow includes directing flow through the tip pocket to heat portions of the external walls.

23. The method as recited in claim 20, wherein the step of communicating flow includes directing flow from an exterior surface of the airfoil, through the tip pocket, and then through a pocket opening along the radially outer face.

24. The method as recited in claim 22, comprising dimensioning the tip pocket such that the airfoil is tuned with respect to one or more vibratory modes.

* * * * *